(12) United States Patent
Kim et al.

(10) Patent No.: US 6,738,553 B2
(45) Date of Patent: May 18, 2004

(54) OPTO-ELECTRICAL CROSS CONNECT DEVICE OF HIGH DENSITY

(75) Inventors: Byung-Jik Kim, Songnam-shi (KR); Yun-Je Oh, Suwon-shi (KR); Seong-Taek Hwang, Pyeongtaek-shi (KR); Jun-Ho Koh, Songnam-shi (KR); Sang-Ho Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 09/921,184

(22) Filed: Aug. 2, 2001

(65) Prior Publication Data

US 2002/0012513 A1 Jan. 31, 2002

(30) Foreign Application Priority Data

Aug. 5, 2000 (KR) ........................................ 2000-45478

(51) Int. Cl.[7] ................................................. G02B 6/00
(52) U.S. Cl. ...................................................... 385/134
(58) Field of Search .............................. 385/14, 15, 49, 385/88, 134, 24, 25, 147, 16

(56) References Cited

U.S. PATENT DOCUMENTS 4,895,425 A * 1/1990 Iwano et al. .................. 385/60
5,625,780 A * 4/1997 Hsieh et al. ................. 395/311
6,021,234 A * 2/2000 Van Deventer .............. 385/24
6,144,561 A * 11/2000 Cannella, Jr. et al. .... 439/62 X
6,285,548 B1 * 9/2001 Hamlet et al. .............. 361/695

FOREIGN PATENT DOCUMENTS

| JP | 05-300548 | 11/1993 | ............ H04Q/1/14 |
| JP | 10-108225 | 4/1998 | ............ H04Q/1/02 |
| JP | 10-257533 | 9/1998 | ............ H04Q/1/14 |

* cited by examiner

Primary Examiner—Son V. Nguyen
(74) Attorney, Agent, or Firm—Cha & Reiter, L.L.C.

(57) ABSTRACT

Disclosed is an opto-electrical cross connect device of high density including a shelf having a plurality of guide rails at its inner portions; a switch motherboard disposed on the rear surface of the shelf; an electric crosspoint switch positioned on the front surface of the switch motherboard; a plurality of switch connectors positioned on the front surface of the switch motherboard; an optical transceiver board mounted in the guide rail of the shelf; and, a transceiver connector disposed at the rear end of the optical transceiver board for connecting to the switch connector of the switch motherboard.

8 Claims, 4 Drawing Sheets

FIG. 1 [PRIOR ART]

OPTO-ELECTRICAL CROSS CONNECT DEVICE OF HIGH DENSITY

CLAIM OF PRIORITY

This application makes reference to and claims all benefits accruing under 35 U.S.C. Section 119 from an application entitled "OPTO-ELECTRICAL CROSS CONNECT DEVICE OF HIGH DENSITY," filed in the Korean Industrial Property Office on Aug. 5, 2000, and assigned Serial No.2000-45478.

BACKGROUND OF THE INVENTION

1. Field of the Invention

The present invention relates to optical communication systems, and, in particular, to an optical cross-connect system.

2. Description of the Related Art

In an optical communication system, an optical cross-connect device is typically provided at an intermediate node connecting the upper node, such as a central base station, and the lower node, such as a subscriber. The optical cross-connect devices can be used in a wide variety of physical circuit topologies to improve the performance of existing networks or to create a new network. In particular, the optical cross-connect device can be used to transmit and allocate channel signals, optimize traffic flows, and control the congestion and growth of an optical network.

FIG. 1 is a schematic diagram illustrating a conventional opto-electrical cross-connect device. As shown in FIG. 1, the conventional cross-connect device includes an N×N electric cross-connect switch 120 at its center portion for rearranging the routing for the N×N optical signals, a switch board 110 with a plurality of 2N radio frequency connectors 130 along its four side ends, and 2N optical transceivers 140 connected to the respective radio frequency connectors 130 of the switch board 110 via the 2N signal cables 150. In the event that the value, "N", representing the number of subsystems increases, the corresponding number of the signal cables also increases. Thus, it becomes cumbersome to perform the interconnections of the 2N signal cables 150 to the growing number of systems and subsystems. In addition, the size of the switch board 110 increases to accommodate more of the 2N radio frequency connectors 130 at its side ends.

Therefore, there is a need for a novel packaging system that minimizes the size of the overall layout and maximizes the workable volume of the package.

SUMMARY OF THE INVENTION

The present invention is directed to an optical cross-connect device, which can improve spatial efficiency without requiring the interconnection of signal cables.

According to an aspect of the invention, there is an optical cross-connect device that can improve the integration of the optical transceivers coupled thereto.

To achieve the above objects, there is provided an opto-electrical cross connect device of high density, including: a shelf with a plurality of guide rails at its inner portions; a switch motherboard disposed on the rear surface of the shelf; an electric crosspoint switch positioned on the front surface of the switch motherboard; a plurality of switch connectors positioned on the front surface of the switch motherboard; an optical transceiver board mounted in the guide rail of the shelf; and a transceiver connector disposed at the rear end of the optical transceiver board, for connecting to the switch connector of the switch motherboard.

The foregoing and other features and advantages of the invention will be apparent from the following, more detailed description of preferred embodiments as illustrated in the accompanying drawings in which reference characters refer to the same parts throughout the various views. The drawings are not necessarily to scale; the emphasis instead is placed upon illustrating the principles of the invention.

DETAILED DESCRIPTION OF THE PREFERRED EMBODIMENT

An opto-electrical cross connect device of high density in accordance with the preferred embodiment of the present invention will now be described in detail with reference to the accompanying drawings. It is understood that the present invention is not limited to this preferred embodiment; various changes and modifications can be made by one skilled in the art within the spirit and the scope of the present invention.

Figure 1:
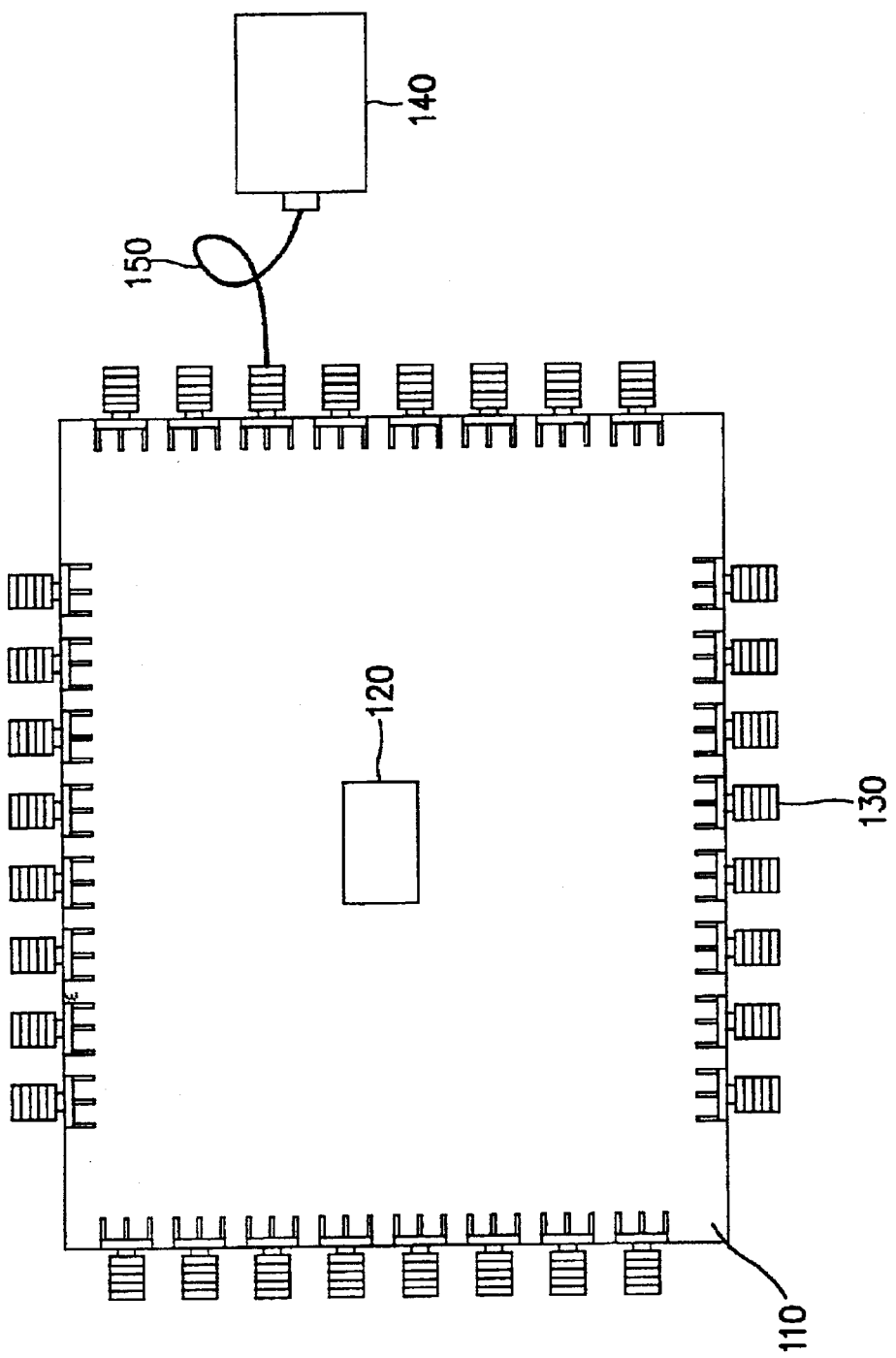
FIG. 1 is a schematic diagram illustrating a conventional opto-electrical cross connect device.
Figure 2:
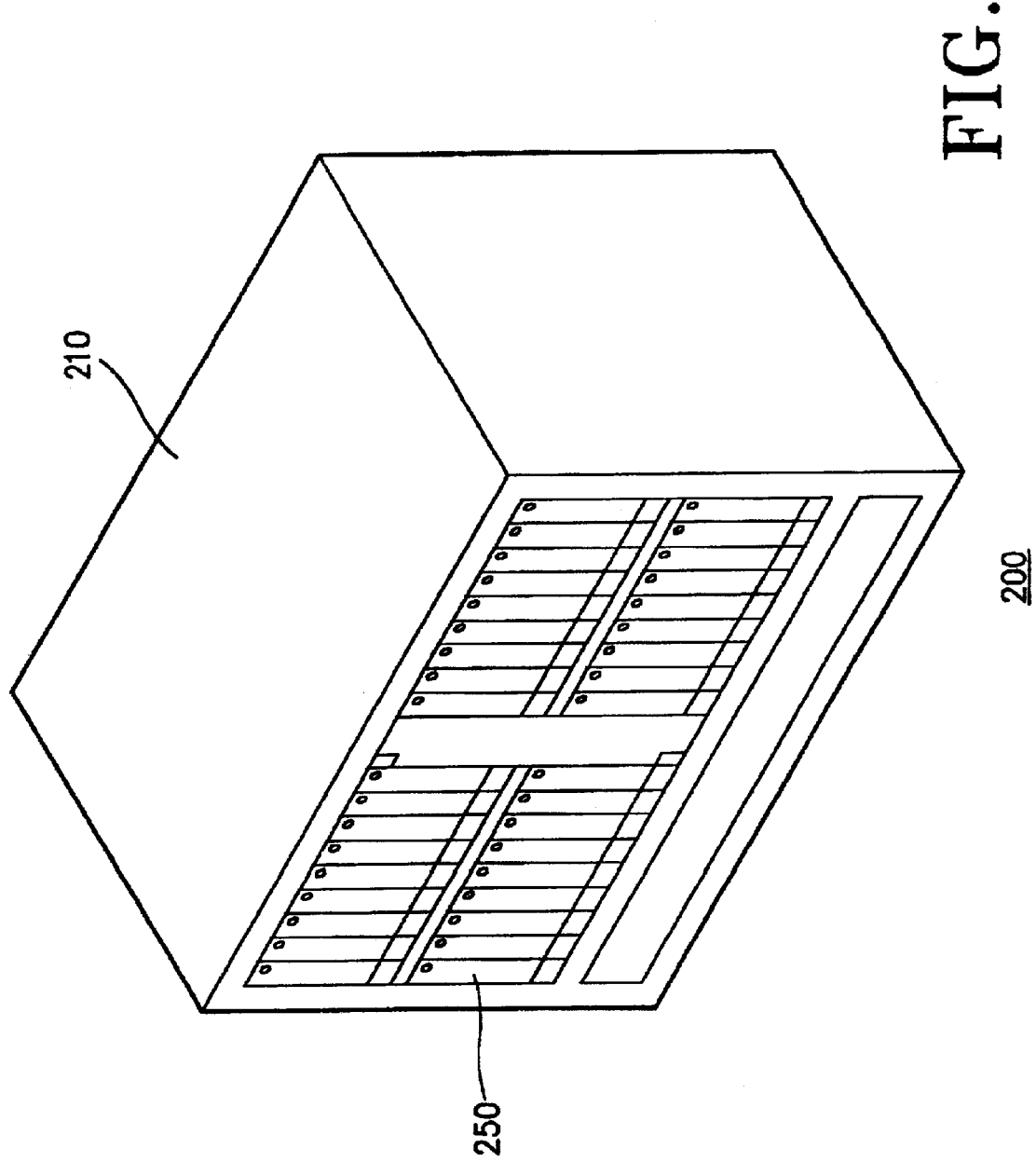
FIG. 2 is a perspective diagram illustrating an opto-electrical cross connect device in accordance with a preferred embodiment of the present invention.
Figure 3:
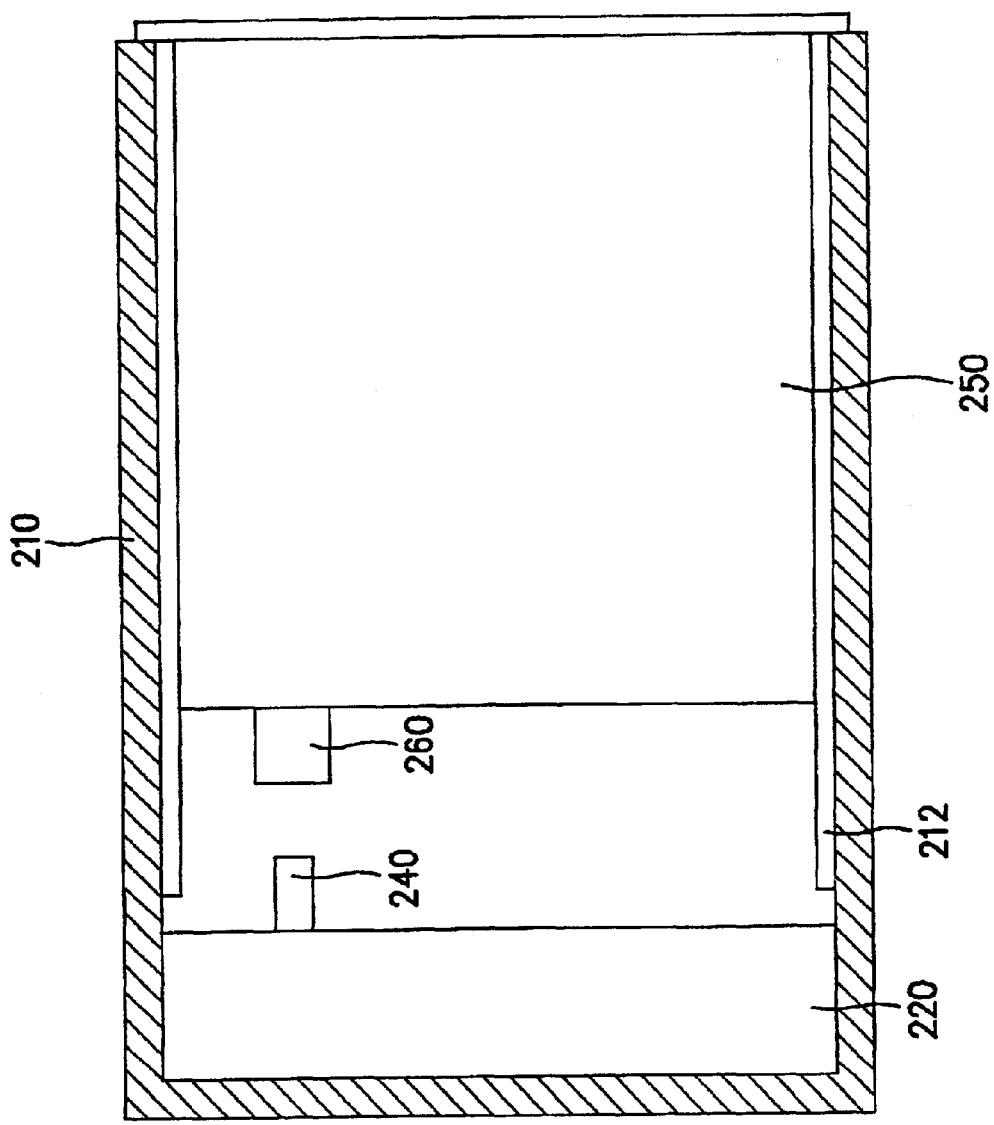
FIG. 3 is a schematic side diagram illustrating a switch motherboard and an optical transceiver board of the opto-electrical cross connect device in accordance with the preferred embodiment of the present invention; and, FIG. 4 is a schematic front diagram illustrating the switch motherboard of the opto-electrical cross connect device in accordance with the preferred embodiment of the present invention.
Figure 4:
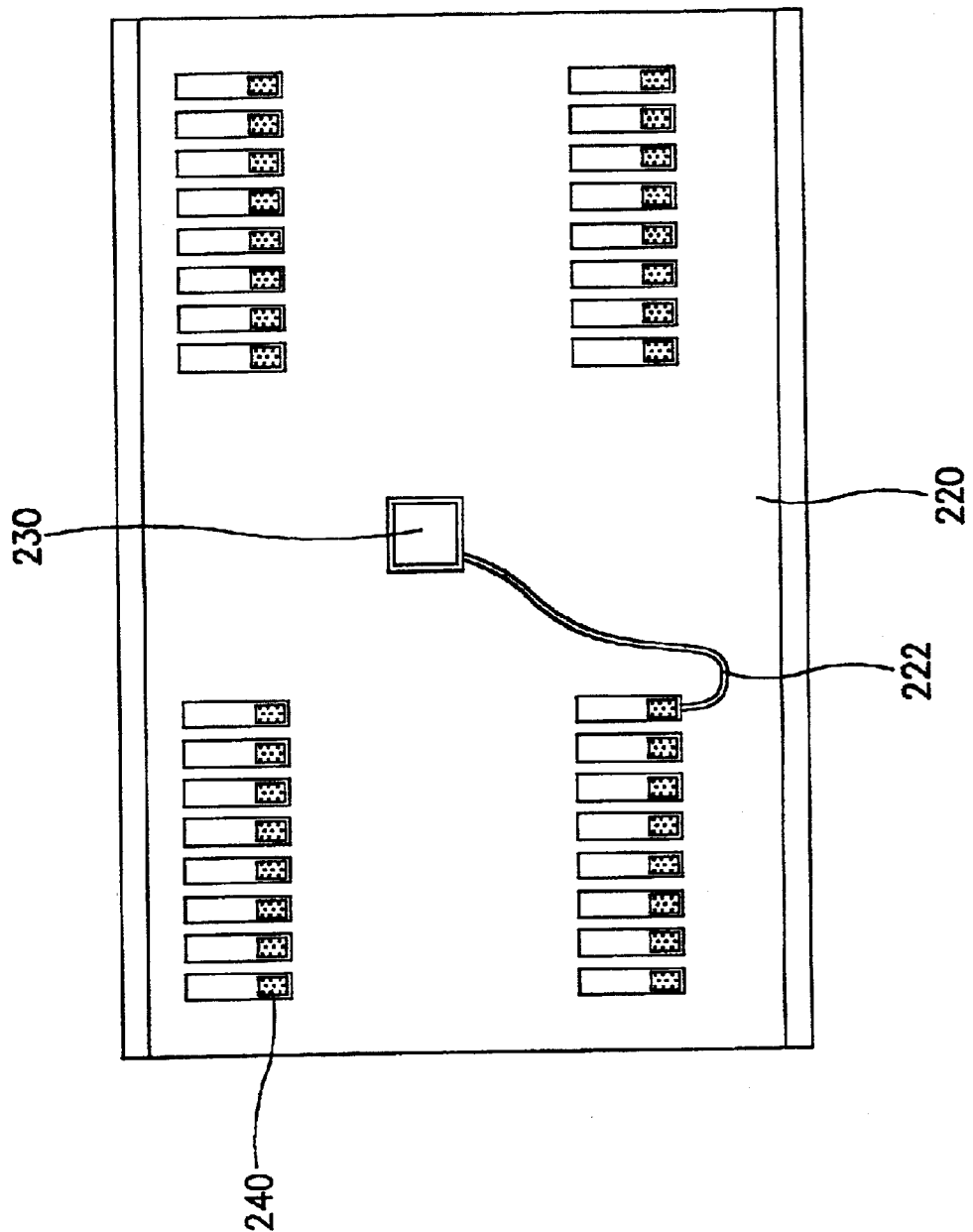

Referring to FIGS. 2 to 4, major components of the opto-electrical cross-connect device 200 in accordance with the preferred embodiment of the present invention include a shelf 210, a switch motherboard 220, and an optical transceiver board 250. The inventive optical cross-connect system 200 of virtual transparency may be configured to support input bit-rates within a few milliseconds. In particular, the shelf 210, where components of the opto-electrical cross connect device 200 are mounted, includes an array of guide rails 212 in parallel at the upper and lower levels. The function of the guide rails 212 is to guide the respective optical transceiver boards 250 to be vertically mounted on the shelf 210, as well as to maintain a predetermined interval distance between the optical transceiver boards 250.

Referring to FIG. 3, the switch motherboard 220 is disposed at the rear surface of the shelf 210. Referring to FIG. 4, an electric crosspoint switch 230 is positioned at the outer center portion of the switch motherboard 220. The optical transceiver board 150 converts an incoming optical signal into the corresponding electrical signal, and the electrical crosspoint switch 230 transmits the electrical signal to another adjacent optical transceiver board 250. It will be appreciated by those skilled in this art that the crosspoint switch 230 may be any type of circuitry suitable for forming electrical data paths between selected electrical inputs and selected electrical outputs. A plurality of switch connectors 240 in an array of arrangements are positioned at four corners of the electric crosspoint switch 230. Although a limited number of switch connectors 240 are shown in FIG. 4 for illustrative purposes, it is to be understood that the inventive system 200 can support a much larger number of switch connectors 240. Thus, the number of switch connectors 240 in the drawing should not impose limitations on the scope of the invention. The electric crosspoint switch 230 and the switch connectors 240 are connected through an impedance signal line 222, that is formed on the switch motherboard 220 in a pattern shape. The impedance signal line 22 may be detachably coupled to any one of the switch connectors 240. Both the electric crosspoint switch 230 and the switch connectors 240 are provided on the surface of the switch motherboard 220, as shown in FIG. 4, to improve the connectivity integration thereof (hereinafter, for simplicity, the surface of the switch motherboard 220 where the electric crosspoint switch 230 and the switch connectors 240 are formed will be defined as the "front surface," and the opposite surface will be defined as the "rear surface").

Referring back to FIG. 3, each optical transceiver board 250 is slidably mounted along the guide rail 212 of the shelf 210. A transceiver connector 260 connecting to the switch connector 240 of the switch motherboard 220 is provided at the rear end of the optical transceiver board 250, which is coupled to other optical platform transport systems. That is, the optical transceiver board 250, according to the embodiment of the present invention, is not connected to the switch motherboard 220 through a special signal cable as in the prior art system. Instead, it is directly connected to the switch connector 240 of the switch motherboard 220 using the transceiver connector 260. The signal outputted from the transceiver connector 260 of the optical transceiver board 250 is transmitted to the switch motherboard 220 through the switch connector 240, then forwarded to the electric crosspoint switch 230 via the impedance signal line 222.

As discussed above, in accordance with the present invention, the switch motherboard 220 and the optical transceiver board 250 are connected through the transceiver connector 260, instead of using a signal cable as in the prior art system. In addition, the electric crosspoint switch 230 and the switch connectors 240 are positioned on the same front surface of the switch motherboard 250 that is located at the rear surface of the shelf 210, thus improving easier integration of the optical transceiver board 250.

What is claimed:

1. An optical cross-connect device, comprising:
   at least one shelf having a plurality of guide rails;
   a switch motherboard disposed at a rear end of said shelf;
   at least one electric crosspoint switch disposed on a surface of said switch motherboard;
   a plurality of switch connectors positioned on a front surface of said switch motherboard; and
   a plurality of optical transceiver boards mounted along said guide rails of said shelf, the optical transceiver boards having a transceiver connector for connecting to one of said switch connectors positioned on the front surface of said switch motherboard.

2. The device according to claim 1, wherein said electric crosspoint switch is disposed at a front center portion of said switch motherboard, and wherein a multiple array of said switch connectors are disposed near said electric crosspoint switch.

3. The device according to claim 1, wherein said electric crosspoint switch and said switch connectors are connected through an impedance signal line that is formed on said switch motherboard.

4. The device according to claim 1, wherein said guide rails enable said optical transceiver boards to be vertically mounted on said shelf.

5. The device according to claim 1, wherein said guide rails maintain a predetermined interval distance between said optical transceiver boards.

6. The device according to claim 1, wherein each of said optical transceiver boards is slidably mounted along said guide rail of said shelf to enable said optical transceiver board to be electrically coupled to one of the plurality of said switch connectors.

7. An optical cross-connect device, comprising:
   at least one shelf having a plurality of guide rails running in parallel thereon;
   a switch motherboard disposed at a rear end of said shelf;
   at least one electric crosspoint switch disposed on a surface of said switch motherboard;
   at least one array of switch connectors disposed on the outer surface of said switch motherboard; and
   a plurality of optical transceiver boards slidably mounted along said guide rails of said shelf to enable the optical transceiver boards to be electrically coupled to one of the plurality of said switch connectors.

8. The device according to claim 7, wherein said electric crosspoint switch is disposed at a front center portion of said switch motherboard.

* * * * *